(12) United States Patent
Lim et al.

(10) Patent No.: US 9,161,345 B2
(45) Date of Patent: Oct. 13, 2015

(54) METHOD AND DEVICE FOR PERFORMING TERMINAL-TO-TERMINAL COOPERATIVE COMMUNICATION IN WIRELESS ACCESS SYSTEM

(75) Inventors: Dongguk Lim, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 181 days.

(21) Appl. No.: 13/978,361

(22) PCT Filed: Dec. 16, 2011

(86) PCT No.: PCT/KR2011/009713
§ 371 (c)(1),
(2), (4) Date: Jul. 3, 2013

(87) PCT Pub. No.: WO2012/009378
PCT Pub. Date: Jul. 12, 2012

(65) Prior Publication Data
US 2013/0286882 A1 Oct. 31, 2013

Related U.S. Application Data

(60) Provisional application No. 61/430,109, filed on Jan. 5, 2011.

(51) Int. Cl.
*H04W 72/04* (2009.01)
*H04W 24/00* (2009.01)
(Continued)

(52) U.S. Cl.
CPC .......... *H04W 72/0406* (2013.01); *H04W 24/00* (2013.01); *H04W 52/0216* (2013.01);
(Continued)

(58) Field of Classification Search
CPC ... H04W 76/00; H04W 76/02; H04W 76/023; H04W 76/043; H04W 56/00; H04W 56/001; H04W 56/0015; H04W 72/00; H04W 72/04; H04W 72/0406; H04W 72/08; H04W 72/085; H04W 88/00; H04W 88/02; H04W 88/04; H04W 88/06
See application file for complete search history.

(56) References Cited

U.S. PATENT DOCUMENTS

2004/0121766 A1* 6/2004 Benson et al. ................ 455/425
2006/0165035 A1* 7/2006 Chandra et al. .............. 370/329
(Continued)

FOREIGN PATENT DOCUMENTS

KR 10-2009-0056339 6/2009
KR 10-2009-0073973 7/2009
KR 10-2010-0064334 6/2010
(Continued)

*Primary Examiner* — Hassan Kizou
*Assistant Examiner* — Hector Reyes Ortiz
(74) *Attorney, Agent, or Firm* — Lee, Hong, Degerman, Kang & Waimey

(57) ABSTRACT

The present invention provides a method for a source terminal performing client cooperation in a wireless access system, and the method includes: receiving, from a base station, first control information for performing client cooperation, wherein the first control information contains resource area information that is allocated for channel state measurement between a source terminal and a cooperative terminal and a control signal that is used for the channel state measurement; measuring a channel state with the cooperative terminal by using the resource area information and the control signal; receiving, from the base station, second control information for performing client cooperation with the cooperative terminal; and performing client cooperation by using the second control information, wherein the first control information further contains frame structure information for defining an operation for the source terminal and the cooperative terminal performing client cooperation in a client cooperation frame.

15 Claims, 9 Drawing Sheets

(51) Int. Cl.
*H04W 52/02* (2009.01)
*H04W 76/02* (2009.01)
*H04W 88/04* (2009.01)
*H04W 88/06* (2009.01)
*H04W 92/18* (2009.01)
*H04L 1/00* (2006.01)

(52) U.S. Cl.
CPC ... *H04W52/0219* (2013.01); *H04L 2001/0097* (2013.01); *H04W 76/023* (2013.01); *H04W 88/04* (2013.01); *H04W 88/06* (2013.01); *H04W 92/18* (2013.01)

(56) References Cited

U.S. PATENT DOCUMENTS

| | | | |
|---|---|---|---|
| 2009/0011778 A1* | 1/2009 | Jung et al. | 455/456.3 |
| 2010/0165882 A1* | 7/2010 | Palanki et al. | 370/254 |
| 2011/0228666 A1* | 9/2011 | Barbieri et al. | 370/216 |
| 2011/0258313 A1* | 10/2011 | Mallik et al. | 709/224 |
| 2012/0115518 A1* | 5/2012 | Zeira et al. | 455/500 |
| 2012/0129562 A1* | 5/2012 | Stamoulis et al. | 455/517 |

FOREIGN PATENT DOCUMENTS

KR 10-2010-0105485 9/2010

* cited by examiner

FIG. 3
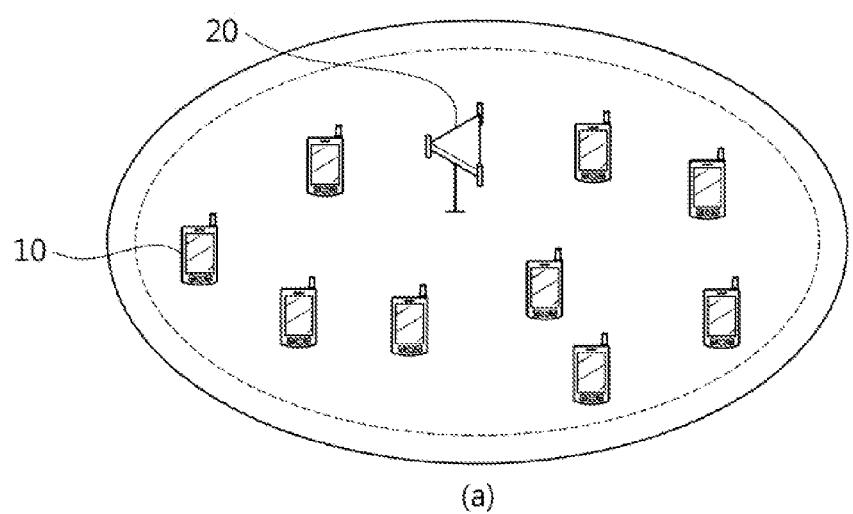
(a)
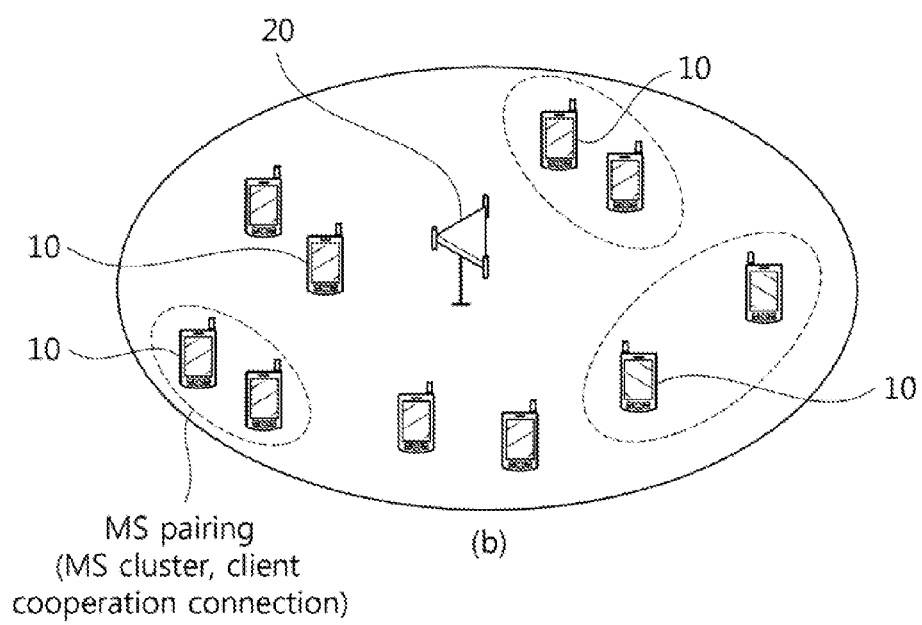
MS pairing
(MS cluster, client
cooperation connection)
(b)

METHOD AND DEVICE FOR PERFORMING TERMINAL-TO-TERMINAL COOPERATIVE COMMUNICATION IN WIRELESS ACCESS SYSTEM

CROSS-REFERENCE TO RELATED APPLICATIONS

This application is the National Stage filing under 35 U.S.C. 371 of International Application No. PCT/KR2011/009713, filed on Dec. 16, 2011, which claims the benefit of U.S. Provisional Application Ser. No. 61/430,109, filed on Jan. 5, 2011, the contents of which are all hereby incorporated by reference herein in their entirety.

BACKGROUND OF THE INVENTION

1. Field of the Invention

The present invention relates to a wireless access system and, more particularly, to a method and apparatus for performing device-to-device (D2D) client cooperation.

2. Related Art

Standardization for a cooperative-MIMO (CO-MIMO) and a signal transmission through a relay or femto cell in an IEEE 802.16m system or LTE (-A) system is in progress to enhance transmission efficiency and throughput of mobile stations (MSs) with poor channel status among MSs positioned in a cell.

Further, besides methods of supporting MSs using a base station or a femto cell or relay that operates as a base station as described above, research for cooperative communication (e.g., mobile relaying) that transmits signals through cooperation between MSs or a client cooperation (CC) is recently underway for the 802.16 systems or LTE (-A) systems.

Current cellular wireless transmission systems define transmission/reception methods between a base station and an MS. In such case, the base station may transmit signals to the MS using a femto BS or relay station (RS) so as to effectively transmit signals to the MS.

In the foregoing, the femto-BS or RS plays a role as a base station. In the current IEEE 802.16 and 3GPP LTE/LTE-A standards, signal transmission over links between BS (or femto-BS)-MS, BS-RS, and MS-RS are being actively standardized.

However, more research is being conducted not only on device-to-device communication between the human type device (HTC), but also on device-to-device communication between machine type devices (MTCs) with increasing demand for lower power consumption, transmission reliability, or enhanced throughput.

SUMMARY OF THE INVENTION

The present invention provides a method for measuring a transmission link, that is, a channel state between mobile stations which perform client cooperation in order to perform cooperation communication between the mobile stations.

Furthermore, the present invention provides a frame structure for defining an operation of mobile stations performing client cooperation.

In an aspect, a method of performing, by a source mobile station, client cooperation in a wireless access system supporting cooperation communication between mobile stations is provided. The method includes receiving first control information for the cooperation communication from a base station, wherein the first control information comprises resource region information allocated for channel state measurement between the source mobile station and a cooperative mobile station and a control signal used for the channel state measurement between the source mobile station and a cooperative mobile station, measuring a channel state with the cooperative mobile station using the resource region information and the control signal, receiving second control information for performing the client cooperation with the cooperative mobile station from the base station, and performing the client cooperation using the second control information, wherein the first control information further comprises frame structure information defining an operation for which the source mobile station and the cooperative mobile station perform the client cooperation in a client cooperation frame.

The measuring the channel state may include the source mobile station transmitting the control signal to the cooperative mobile station through a resource region for the channel state measurement, and the source mobile station obtaining synchronization with the cooperative mobile station and measuring the channel state using the control signal.

The resource region information may further comprise a number of subframes in which the control signal is transmitted and indication information indicating the subframes in which the control signal is transmitted.

The control signal may be a ranging sequence, a reference signal, or a sounding signal.

The frame structure information may be information on which the source mobile station performs the client cooperation with an operation being on in an $N^{th}$ frame and an operation being off in remaining subframes of an $(N+1)^{th}$ frame other than a first subframe, and the cooperative mobile station performs the client cooperation with an operation being off in downlink subframes of the $N^{th}$ frame other than a first subframe and an operation being on in uplink subframes of the $N^{th}$ frame and the $(N+1)^{th}$ frame.

The frame structure information may be information on which the source mobile station performs the client cooperation with an operation being on in an $N^{th}$ frame and an operation being off in remaining subframes of an $(N+1)^{th}$ frame other than a first subframe, and the cooperative mobile station performs a monitoring operation of a signal in remaining downlink subframes of the $N^{th}$ frame other than a first downlink subframe and performs a reception operation in downlink subframes of the $(N+1)^{th}$ frame.

The frame structure information may be information on which the cooperative mobile station performs a sleep operation in at least one downlink subframe of an $N^{th}$ frame and the source mobile station performs a sleep operation in remaining subframes of an $(N+1)^{th}$ frame other than a first subframe.

The first control information may comprise at least one of a station identifier (STID), a pilot pattern, reference sequence information, a time offset, and transmit power.

The second control information may comprise at least one of a start time, duration, and a transmit parameter of the client cooperation.

In another aspect, a method of performing, by a cooperative mobile station, client cooperation in a wireless access system supporting cooperation communication between mobile stations is provided. The method includes receiving first control information for the cooperation communication from a base station, wherein the first control information comprises resource region information allocated for channel state measurement between a source mobile station and the cooperative mobile station and a control signal used for the channel state measurement between the source mobile station and the cooperative mobile station, measuring a channel state with the source mobile station using the resource region information and the control signal, receiving second control information for performing the client cooperation with the source mobile station from the base station, and performing the client cooperation using the second control information, wherein the first control information further comprises frame structure information defining an operation for which the source mobile station and the cooperative mobile station perform the client cooperation in a client cooperation frame.

The method may further include transmitting a result of the channel state measurement with the source mobile station to the base station.

In another aspect, a mobile station for performing client cooperation in a wireless access system is provided. The mobile station includes a radio frequency (RF) unit for transmitting and receiving radio signals with an outside, and a controller connected to the RF unit, and configured for receiving first control information for cooperation communication between mobile stations from a base station, wherein the first control information comprises resource region information allocated for channel state measurement between mobile stations which performs the client cooperation and a control signal used for the channel state measurement, measuring a channel state between the mobile stations using the resource region information and the control signal, receiving second control information for performing the client cooperation with from the base station, and performing the client cooperation using the second control information, wherein the first control information further comprises frame structure information defining an operation for performing the client cooperation in a client cooperation frame.

The present invention has an advantage in that client cooperation with a cooperative mobile station having the best channel state can be performed by defining a method of measuring a channel state between mobile stations performing client cooperation.

Furthermore, the present invention has an advantage in that resources used to measure a channel state between mobile stations can be efficiently used by providing a method of transmitting a control signal (a ranging sequence or a sounding signal) for the channel state measurement.

Furthermore, the present invention has an advantage in that the power consumption of mobile stations performing client cooperation can be reduced by providing information about a frame structure for performing the client cooperation to terminals performing the client cooperation.

BRIEF DESCRIPTION OF THE DRAWINGS

FIGS. 3(*a*) and (*b*) shows a concept of a cooperative cluster of mobile stations according to an embodiment of the present invention.

DESCRIPTION OF EXEMPLARY EMBODIMENTS

Figure 1:
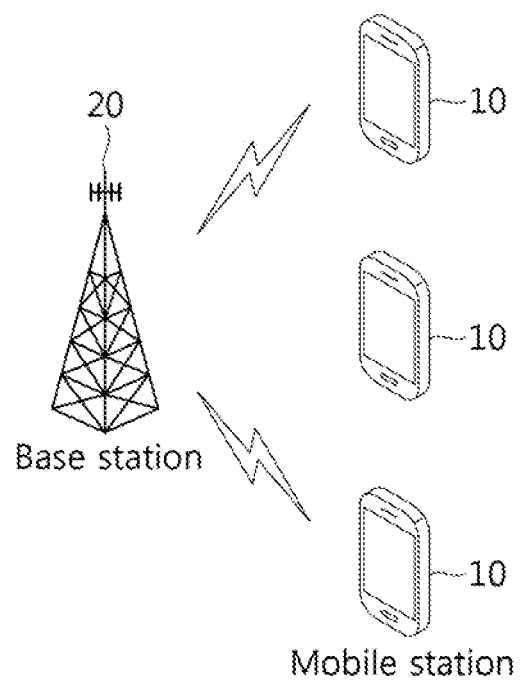
FIG. 1 is a concept diagram showing a wireless communication system according to an embodiment of present invention.

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e.

The UTRA is part of a universal mobile telecommunications system (UMTS).

3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, preferred embodiments according to the present invention are described in detail with reference to the accompanying drawings. The same or similar elements are assigned the same reference numerals irrespective of their reference numerals, and a redundant description thereof is omitted. Furthermore, in describing the present invention, a detailed description of the known functions and constructions will be omitted if it is deemed to make the gist of the present invention unnecessarily vague. Furthermore, the accompanying drawings are provided to help easily understand the spirit of the present invention, and it is to be noted that the spirit of the present invention should not be limited by the spirit of the present invention. The spirit of the present invention should be interpreted as being extended up to all changes, equivalents to substitutes other than the accompanying drawings.

FIG. 1 is a concept diagram showing a wireless communication system according to an embodiment of present invention. Wireless communication systems may be widely arranged to provide various communication services such as voice, packets, or data.

Referring to FIG. 1, the wireless communication system includes a mobile station 10 (MS) and a base station 20 (BS). The MS 10 may be stationary or mobile and may be referred to by other terms such as a user equipment (UE), a user terminal (UT), a subscriber station (SS), a wireless device or an advanced mobile station (AMS).

Further, in case the wireless communication system shown in FIG. 1 supports device cooperative communication (or transmission), the MS 10 includes the concept of a device cooperation requesting device requesting a device cooperation, a device cooperation accepting device accepting the device cooperation, and a cooperation participating device participating in the device cooperation.

Hereinafter, what is related to client cooperation is briefly described.

Client cooperation (CC) or cooperative communication (CC) refers to transmitting and receiving signals or data through a direct (link) communication between devices and cooperatively transmitting the transmitted/received signals or data to a base station or a device.

Here, devices may be classified, depending on their operation and roles, into non-cooperative terminals, cooperation-capable terminals, cooperation participating terminals, cooperative transmission terminals, and cooperation requesting terminals. The non-cooperative terminals may also be referred to as single transmission terminals. The cooperation-capable terminals may also be referred to as cooperative terminal candidates.

Here, the cooperation participating terminals refer to terminals that participate in client cooperation but do not send data to a base station.

Hereinafter, as used herein, an MS requesting client cooperation may be referred to as a first MS, and an MS accepting client cooperation request, i.e., an MS transmitting UL data of the first MS to the base station, may be referred to as a second MS.

As described above, the first MS may be also referred to a cooperation requesting MS, a source MS (S-MS) or a cooperation subject device, and the second MS may be also referred to a cooperation accepting MS, a cooperating MS (C-MS), a target MS (T-MS), or a cooperated MS. Here, the term "second MS" includes both the cooperative transmission MS and the cooperation participating MS.

In other words, the first MS means an MS that independently attends data transmission/reception with a base station and/or a relay station, and the second MS means an MS that assists in data transmission/reception with a base station and/or a relay station.

Further, a direct transmission between two MSs performing cooperative communication may use single RAT or multi RATs. At this time, in case an MS performing client cooperation supports the multi RAT, a RAT different from a RAT (radio access transmission) used for signal transmission with the base station may be used to perform signal transmission/reception between the two MSs. A detailed description thereof will be given below with reference to FIG. 5.

Further, the base station transmits information on client cooperation to the two MSs performing client cooperation (source MS and cooperative MS) through a DL signal (e.g., CC_Transmission_info). At this time, the DL signal may contain the following information for CC.

That is, CC_Transmission_info includes information described below in (1) to (6):

(1) Device pairing or grouping information for performing client cooperation, or an MS ID (STID or C-RNTI) of an MS performing CC operation in case grouping or pairing ID is not used (2) Resource allocation information for CC Here, the resource allocation information for CC includes UL resource info assigned by the base station for CC operation, the number of RBs or subbands, indexes of RBs or subbands, start points of symbols or carriers.

(3) Power control offset and initial transmission power (initial Tx power) information (4) Transmission information relating to MIMO, rank, and MCS (5) Time offset information indicating a start of CC operation (6) Information indicating a start of other RAT (other RAT start indicator)

For example, the information indicating a start of other RAT includes channel index information and an indicator for starting Wi-Fi operation.

Client cooperation (or cooperative communication) will be described below in more detail with reference to FIGS. 5 to 7.

The base station 20 is generally a fixed station communicating with the MS 10 and may be referred to by other terms such as a nodeB, a base transceiver system (BTS), or an access point. One or more cells may be included in one base station 20.

The wireless communication system may be an orthogonal frequency division multiplexing (OFDM)/orthogonal frequency division multiple access (OFDMA)-based system. OFDM uses multiple orthogonal subcarriers. OFDM uses orthogonality between inverse fast Fourier Transform (IFFT) and fast Fourier transform (FFT). In a transmitter, data is subjected to IFFT and is transmitted. In a receiver, a received signal undergoes FFT so that the original data is restored. The transmitter uses IFFT to combine multiple subcarriers, and the receiver uses corresponding FFT to separate the multiple subcarriers.

Heterogeneous-Network Wireless Communication Environment

Figure 2:
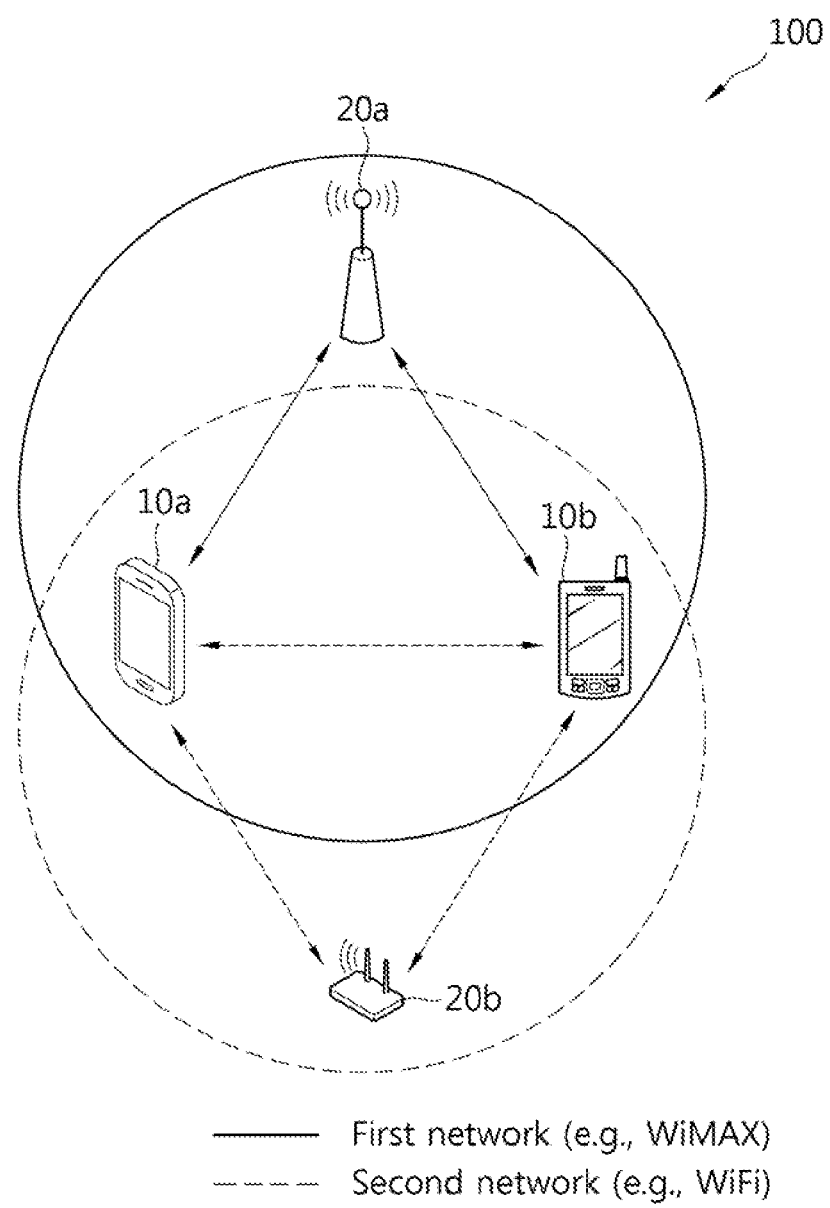
FIG. 2 shows an example of a system performing client cooperation (CC) in a wireless communication environment with two or more heterogeneous networks (multi-RAT) according to an embodiment of the present invention.

FIG. 2 shows an example of a system performing client cooperation (CC) in a wireless communication environment with two or more heterogeneous networks (multi-RAT) according to an embodiment of the present invention.

In a mobile communication system, a user equipment may receive information over a downlink from a base station, and the user equipment may transmit information over an uplink. Information transmitted/received from/to the user equipment includes data and various types of control information, and various physical channels are provided depending on the type and purpose of information transmitted/received from/to the user equipment.

In the current communication environment, two or more heterogeneous networks different from each other may be present. For example, various heterogeneous networks such as a WiMax network, which is an exemplary mobile communication system network, and a Wi-Fi network may be provided. The heterogeneous network refers to a network that adopts a communication scheme different from a communication scheme used in a specific network, and the heterogeneous device refers to a device that belongs to the heterogeneous network adopting the different communication scheme from that of the specific network.

For example, with respect to the WiMAX network and the device belonging to the WiMAX network, since the WiFi network uses a different communication scheme from that used in the WiMAX network, the WiFi network is a heterogeneous network, and the device belonging to the WiFi network is a heterogeneous device. With respect to the WiFi network, the WiMAX network would be a heterogeneous network, and the device belonging to the WiMAX network would be a heterogeneous device.

As used herein, the "multimode MS" refers to a device supporting use of two or more heterogeneous networks (or a plurality of RATs). The Wi-Fi refers to an local area network (LAN) that may provide high-speed Internet access within a predetermined range of a place where an access point (AP) is installed. The Wi-Fi uses a radio frequency (RF) or an infrared (IR) transmission scheme and is often referred to as wireless LAN.

In a wireless communication environment, a multimode MS may use a heterogeneous network provided to support a heterogeneous device in addition to the radio access technology (RAT) being serviced, in order to perform efficient signal transmission and reception or in order to enhance throughput. The RAT is a type of technology used for radio access. For example, the RAT includes GSM/EDGE radio access network (GERAN), UMTS terrestrial radio access network (UTRAN), evolved-UMTS terrestrial radio access network (E-UTRAN), WiMAX, LTE (-A), and Wi-Fi. In the same area, GERAN, UTRAN, E-UTRAN, WiMAX, and/or Wi-Fi may be mixed.

At this time, the multimode MS, which supports a plurality of RATs to enable use of two or more heterogeneous networks, is not restricted to a specific RAT and may transmit and receive signals using other RATs to be able to receive the best service in the current device situation. The number of heterogeneous networks (a plurality of RATs) accessed by the multimode MS to perform signal transmission and reception may be two or more. Accordingly, the multimode MS may conduct signal transmission and reception with or in cooperation with each of base stations using RATs different from the serving base station or base stations using a heterogeneous network (heterogeneous RAT).

Referring to FIG. 2, in the wireless communication system 100, an MS may transmit and receive signals using two or more heterogeneous networks (or a plurality of RATs).

In FIG. 2, as an example, an MS transmits and receives signals using a first network (e.g., WiMAX network) and a second network (e.g., Wi-Fi network). In the wireless communication system, a first MS 10a and a second MS 10b are multimode MSs that may use two or more heterogeneous networks, that is, may support multi-RATS.

In other words, as shown in FIG. 2, the first MS 10a and the second MS 10b support a multimode to be able to transmit and receive signals through the WiMAX network and the Wi-Fi network that are heterogeneous networks with respect to each other. [74] At this time, in the wireless communication system 100, there may be a base station (20a, BS) over the first network (WiMAX network). In the wireless communication system, the first MS 10a and the second MS 10b supporting the multi-RAT may transmit and receive signals through the first network (WiMAX network).

Further, in the wireless communication system, there may be an access point (20b, AP) corresponding to a base station in the second network (Wi-Fi network). In the wireless communication system, the first MS 10a and the second MS 10b supporting the multi-RAT may transmit and receive signals through the second network (Wi-Fi network).

That is, in the wireless communication system 100, the first MS 10a and the second MS 10b may perform communication through the access point 20b according to the configuration of the infrastructure mode or may directly communicate with each other according to the configuration of the Ad-hoc mode. Hereinafter, although no specific mention is made on the access point 20b, the first MS 10a and the second MS 10b are assumed to be able to transmit and receive signals therebetween through the second network (WiFi network).

As used herein, client cooperation (CC) performed between the first MS 10a and the second MS 10b is assumed to be performed for the second network (Wi-Fi network) corresponding to a direct link between MSs, which is different from the first network (WiMAX network) corresponding to a cellular network. As such, an example of the direct link between MSs is a Wi-Fi network in the present invention, but is not limited thereto.

Meanwhile, the first MS 10a and the second MS 10b are grouped or paired to transmit and receive signals through client cooperation (CC). The grouping or pairing of the first MS 10a and the second MS 10b may be done by a method of determining a counterpart MS to perform client cooperation and sending a request by one of the MSs or by a method of indicating information of MSs to perform client cooperation by the base station 20a.

FIG. 3 shows a concept of a cooperative cluster of mobile stations according to an embodiment of the present invention.

As shown in FIG. 3, cooperation-capable MSs may be bundled into a virtual group that is referred to as a cooperative cluster 10'. Here, the cooperative cluster 10' may be also referred to by terms such as client cooperation connection or MS pairing.

Specifically, as shown in FIG. 3(a), the cooperative cluster 10' may include all MSs that may perform client cooperation, or as shown in FIG. 3(b), the cooperative cluster 10' may include cooperation-capable MSs based on geometry information.

The cooperative cluster 10' may be generated by the base station when the MS enters the base station (so-called "network entry"), or may be generated by establishing a direct cooperative relationship between the MSs.

In case the base station generates the cooperative cluster 10', information on the cooperative cluster may be periodically broadcast by the base station. Or, in response to an MS' request, the information on cooperative cluster 10' may be unicast to each MS.

If the MSs, by themselves, form the cooperation cluster, the information on the cooperation cluster may be unicast or multicast by the MSs or any MS.

Meanwhile, FIG. 3 shows an example where the cooperation cluster is generated only for MSs belonging to a cell of a single base station in client cooperation.

Performing Mode of Client Cooperation Between MSs

Figure 4:
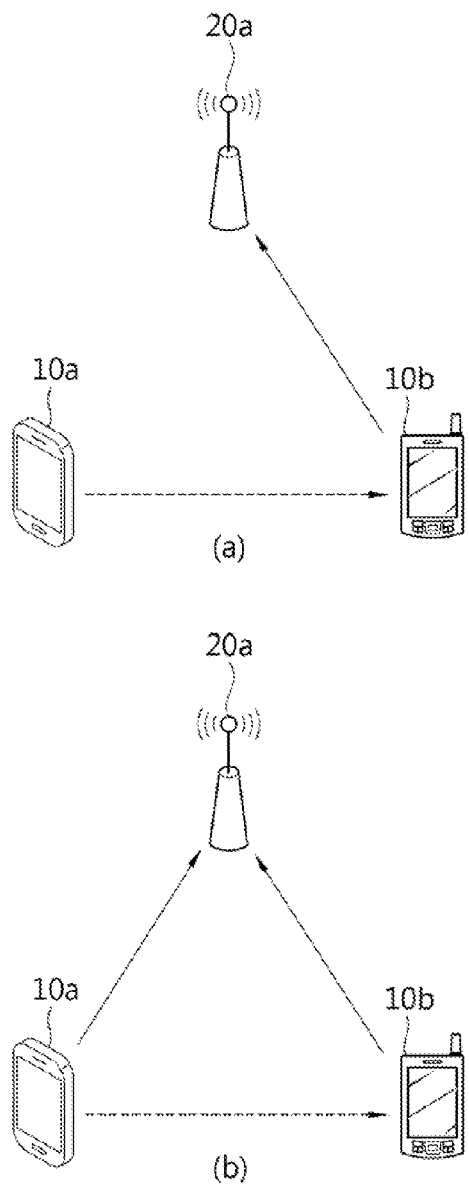
FIGS. 4(*a*) and (*b*) shows an example of client cooperation structure according to an embodiment of the present invention.

FIGS. 4(a) and (b) shows an example of client cooperation structure according to an embodiment of the present invention.

Referring to FIGS. 4(a) and (b), modes in which MSs supporting the multi-RAT perform client cooperation (CC) are described. Hereinafter, for ease of distinction, the term "mode" is used, but is not limited thereto.

In FIGS. 4(a) and (b), the first MS 10a and the second MS 10b have a relationship of performing client cooperation (CC). The first MS 10a operates as a source MS (S-MS) attempting to transmit data to the base station 20, and the second MS 10b operates as a cooperative MS (C-MS) assisting in data transmission and reception of the first MS 10a through client cooperation (CC).

Client cooperation (CC) of the MS supporting the multi-RAT may be applicable to when a large propagation loss occurs in the RAT between the source MS and the base station or when the channel status is not good, and other cases such as when the state of the source MS needs it (e.g., short of remaining battery) irrespective of the channel stat or when a user of the source MS requests quick/emergent transmission.

As such, the multi-RAT supportive MS may operate in a relaying mode or in a cooperative communication mode to perform data transmission and reception through client cooperation.

FIG. 4(a) shows an example where a multi-RAT supportive MS performs client cooperation (CC) in accordance with the relaying mode. In the relaying mode, the source MS (S-MS) attempting to transmit data to the base station transmits data to the cooperative MS (C-MS), and the cooperative MS (C-MS) transmits the data received from the source MS (S-MS) to the base station.

Further detailed description is given with reference to FIG. 4(a). The source MS 10a that supports multi-RAT transmits data to the cooperative MS 10b through a RAT corresponding to a direct link, i.e., second network, and the cooperative MS 10b transfers the received data to the base station 20 through an RAT, i.e., first network, which is different from the RAT corresponding to the direct link. As such, the cooperative MS 10b needs to be assigned with an uplink resource (UL resource) for data transmission. At this time, the uplink resource may be assigned by the base station 20 in response to a request from the source MS 10a or the cooperative MS 10b.

FIG. 4(b) shows an example where a multi-RAT supportive MS performs client cooperation (CC) in accordance with the cooperative communication mode. In the cooperative communication mode, the source MS (S-MS) attempting to send data to the base station transmits data to the cooperative MS (C-MS), and the source MS (S-MS) and the cooperative MS (C-MS) cooperate to transmit data to the base station.

Further detailed description is made with reference to FIG. 4(b). The source MS 10a supporting multi-RAT transmits data to the cooperative MS 10b through a RAT corresponding to a direct link, i.e., second network, and the source MS 10a and the cooperative MS 10b perform cooperative communication through the first network that is a RAT different from the RAT corresponding to the direct link, thereby transferring the received data to the base station 20.

A method of performing client cooperation through a frame structure for client cooperation, according to embodiments of the present invention, is described in detail below.

Figure 5:
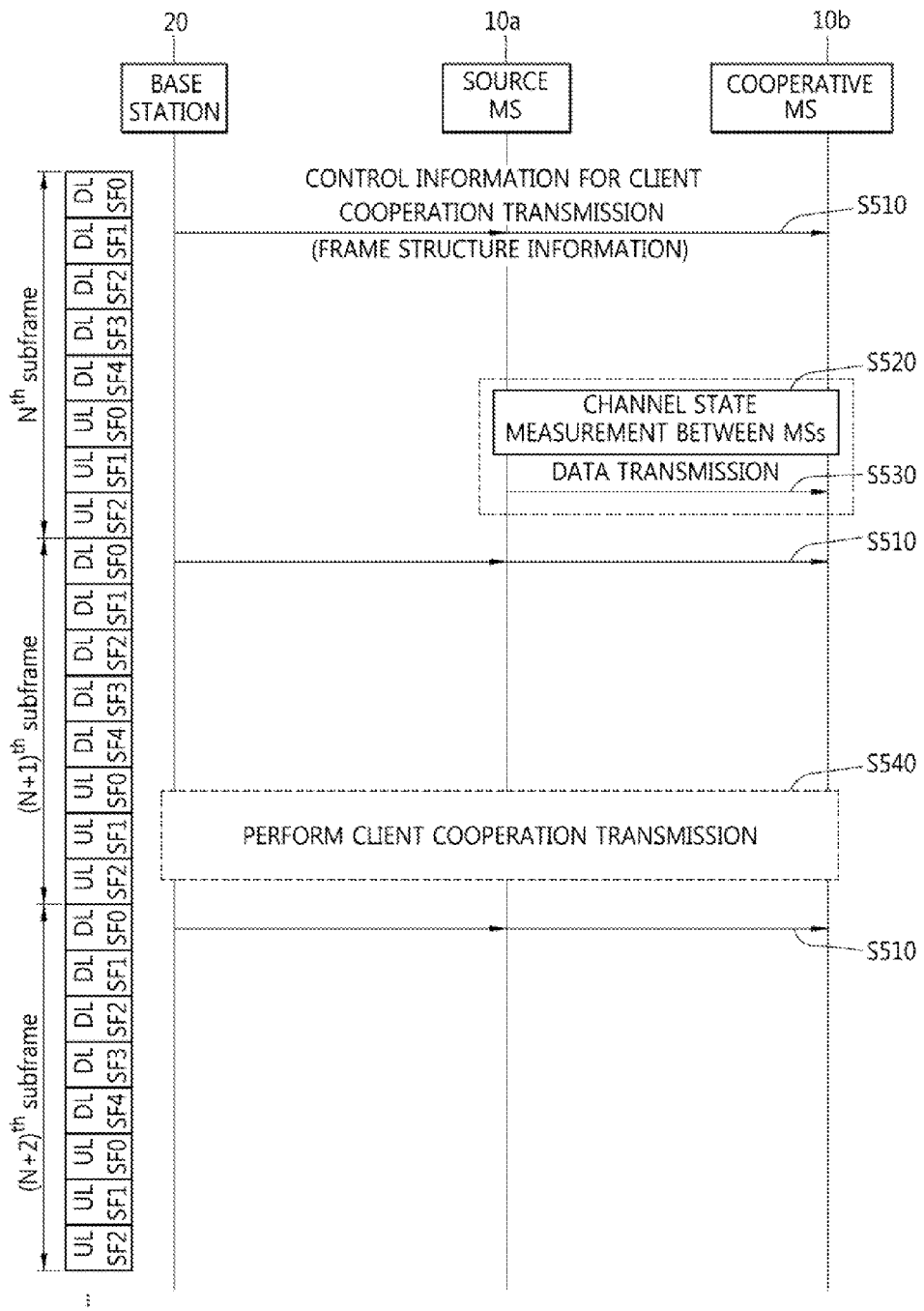
FIG. 5 is a frame structure for client cooperation and a flowchart showing a method for client cooperation using the frame structure according to an embodiment of the present invention.

FIG. 5 is a frame structure for client cooperation and a flowchart showing a method for client cooperation using the frame structure according to an embodiment of the present invention.

Referring to FIG. 5, a source mobile station (S-MS) and a cooperative mobile station (C-MS) receive control information for client cooperation (e.g., device-to-device collaboration transmission) from a base station (S510). The control information may be received through a broadcast, unicast, or multicast control signal. Here, the broadcast control signal may be, for example, a superframe header (SFH) or an advanced-preamble (primary preamble and secondary preamble).

That is, at step S510, the base station may transmit the control information to the S-MS and the C-MS through the broadcast control signal transmitted every frame.

The S-MS and the C-MS may receive the control information, that is, information for client cooperation (device-to-device (D2D) collaborative transmission), through a first subframe of a specific (or every) frame.

Here, the control information may be transmitted to the S-MS and the C-MS using a client cooperation grouping ID, an MS paring ID, or a virtual ID allocated to the S-MS and the C-MS by the base station.

Furthermore, the control information may further include frame structure information indicating a client cooperation operation in a corresponding frame in order for the S-MS and the C-MS to perform the client cooperation. A method of each MS performing the client cooperation based on the frame structure information is described in detail below with reference to FIGS. 6 to 8.

Here, the frame structure information may be transmitted to the S-MS and the C-MS through a broadcast signal (or message), for example, a second superframe header subpacket 1 (S-SFH SP1).

Furthermore, the control information may further include a transmission link between MSs, that is, information related to channel state measurement (or, about channel state measurement) between the S-MS and the C-MS. Here, the information related to the channel state measurement may be transmitted by the base station separately from the control information.

That is, the base station may allocate the information related to the channel state measurement to the S-MS and the C-MS using the frame structures shown in FIGS. 6 to 8 to be described later in order to measure a channel link between MSs which perform the client cooperation, and receive information about a transmission channel state between the S-MS and the C-MS.

Here, the information related to the channel state measurement may include information about a control signal for measuring a channel state between MSs and resource region (or allocation) information for the channel state measurement between MSs.

Here, the control signal for the channel state measurement may be a sounding signal (and channel), a ranging sequence, or a reference (or criterion) signal.

Particularly, the information related to the channel state measurement may be transmitted to an MS performing collaboration transmission (CT), that is, the S-MS and the C-MS, through the following signaling and process.

For example, in an IEEE 802.16m system, information about the a sounding channel and a sounding sequence for channel state measurement between MSs may be used to check the number of subframes in which sounding is transmitted through information about sounding subframes of a S-SFH SP1 within an SFH that is transmitted in each superframe. Here, since the information transmitted through the SFH is information about the number of subframes in which sounding is transmitted, indication information for indicating a subframe corresponding to sounding for the channel state (or link) measurement between MSs may be additionally included in the SFH.

Here, the indication information for indicating a subframe in which the sounding signal for the channel state measurement between MSs is transmitted, from among sounding subframes included in the S-SFH SP1, may be represented by 1 or 2 bits.

Accordingly, the base station may transmit information about the number of subframes in which the sounding signal is transmitted and indication information indicating a subframe in which the sounding signal for the channel state measurement between MSs is transmitted to an MS which perform client cooperation within a cell through the unicast, multi-cast, or broadcast signal. That is, in this case, the information may also be transmitted to MSs which do not substantially perform client cooperation.

Accordingly, both MSs performing client cooperation and MSs not performing client cooperation, from among MSs within a cell, may receive information about a sounding channel used in a client cooperation process from the base station.

Here, the information related to channel state measurement between MSs, that is, information about a sounding signal and a channel used for client cooperation may be transmitted to MSs performing client cooperation through a D2D collaboration sounding A-MAP transmitted through the downlink subframe of a frame.

Here, the D2D collaboration sounding A-MAP may include a set of pieces of information, such as an A-MAP type, a frame index or offset/number, a D2D sounding AAI subframe offset/starting indication, a grouping/paring/virtual ID, a sounding multiplexing type, a hopping or shift value, a D2D sounding symbol, a sounding sequence, a period, D2D power control information, and an RB indication/RB hopping pattern.

The C-MS may be aware of information about a subframe or symbol in which a sounding signal for the channel state measurement between MSs is transmitted using the D2D Sounding AAI subframe offset/starting indication information.

Here, the base station may differently allocate a subframe (or symbol) in which a sounding signal is transmitted to an MS not performing client cooperation and an MS performing client cooperation.

For example, if a sounding signal for MSs not performing client cooperation (non-collaboration) is transmitted within the same subframe as a sounding signal transmitted for client cooperation, the base station may allocate the sounding signal transmitted for client cooperation so that the sounding signal is transmitted through another symbol within the same subframe. In this case, the base station may indicate the position of a symbol within the subframe in which the sounding signal for client cooperation is transmitted so that the S-MS and the C-MS may be aware of the position of the symbol.

For another example, if the sounding signal for MSs not performing client cooperation (non-collaboration) is transmitted within the same subframe as the sounding signal used for client cooperation, the base station may use a different orthogonal sounding sequence or apply a different shift value to the same sequence so that the sounding signal for MSs is transmitted differentially.

Here, the different orthogonal sounding sequence or the different shift value may be transmitted to MSs performing collaboration transmission, that is, the S-MS and the C-MS, through the D2D unicast/multi-cast/broadcast signal.

Furthermore, the distinguishment of the sounding signal or the sounding channel between the MSs performing client cooperation may be performed using a different shift value, an RB indication, or an RB hopping pattern for MSs grouped/paired for the client cooperation.

Next, the S-MS controls transmission power for the sounding signal based on the information related to channel state measurement and transmits the sounding signal to the C-MS (S520).

Here, the C-MS receives the sounding signal, transmitted by the S-MS, using the information related to channel state measurement that has been received from the base station and performs measurement on the transmission channel (or link) between MSs using the received sounding signal (S520).

For another example, in order to measure the transmission link (channel state) between MSs, the base station may allocate one or more (or at least one) specific UL subframe to MSs performing client cooperation (i.e., the S-MS and the C-MS).

Here, the specific UL subframe means a subframe defined for channel state measurement between MSs.

That is, the base station may allocate one or more specific UL subframe, defined for channel state measurement, to the S-MS and the C-MS so that the S-MS and the C-MS can measure a channel state between MSs by transmitting and receiving a UL sounding signal or a reference signal using the specific UL subframe.

Here, the specific UL subframe may vary in a cell-specific, group-specific, or user-specific way.

As described above, if a fixed subframe for the channel state measurement between MSs is configured and used as a D2D sounding/reference subframe in a UL frame, the base station may transfer information about the sounding/reference signal to the S-MS and the C-MS through the first subframe of the frame. Here, the information about the sounding/reference signal may be transmitted using signaling, such as A-MAP or D2D sounding information or D2D reference information transmitted from the base station to the MSs.

Here, the D2D sounding signaling transmitted from the base station to the S-MS and the C-MS may include pieces of information, such as the number of allocated subframes, order (the locations of the allocated subframe in a UL frame), a sequence number, a shift value, frequency partition, an RU index, power control information, and a symbol index. Here, even when the reference signal is used, the above-described information may be included.

Next, the S-MS transmits the reference/sounding signal to the C-MS through power control using a UL resource within a subframe allocated by the base station for the channel state measurement between MSs.

Here, the C-MS receives the control signal (reference signal or sounding signal), transmitted by the S-MS using the control information for client cooperation received from the base station, through the first subframe of an $n^{th}$ frame.

Next, the C-MS measures a channel state with the S-MS through the received control signal (S520).

Next, the C-MS transmits the measured channel state information (e.g., an SINR, a CINR, an interference level/power, a CSI, a PMI, or a channel matrix) to the base station through the $(N+1)^{th}$ frame of the frame structure using UL resources received from the base station (S530). Here, the measured channel state information may be transmitted from the S-MS to the base station.

Here, the information and the channel measurement information received from the S-MS and transmitted in the $(N+1)^{th}$ frame by the C-MS may include a grouping ID/paring ID/virtual ID allocated by the base station for client cooperation or may be be masked to the ID and transmitted to the base station (S530).

Next, the base station which has received the data of the S-MS and the information about a transmission/reception channel between MSs from the C-MS through the $(N+1)^{th}$ frame transmits the information about the signal (resource allocation, power control, a reference signal/sounding signal, MIMO, and an MCS) transmitted by the S-MS, to the S-MS (or the S-MS and the C-MS) in a next frame $(N+2)^{th}$ using a DL subframe.

Figure 6:
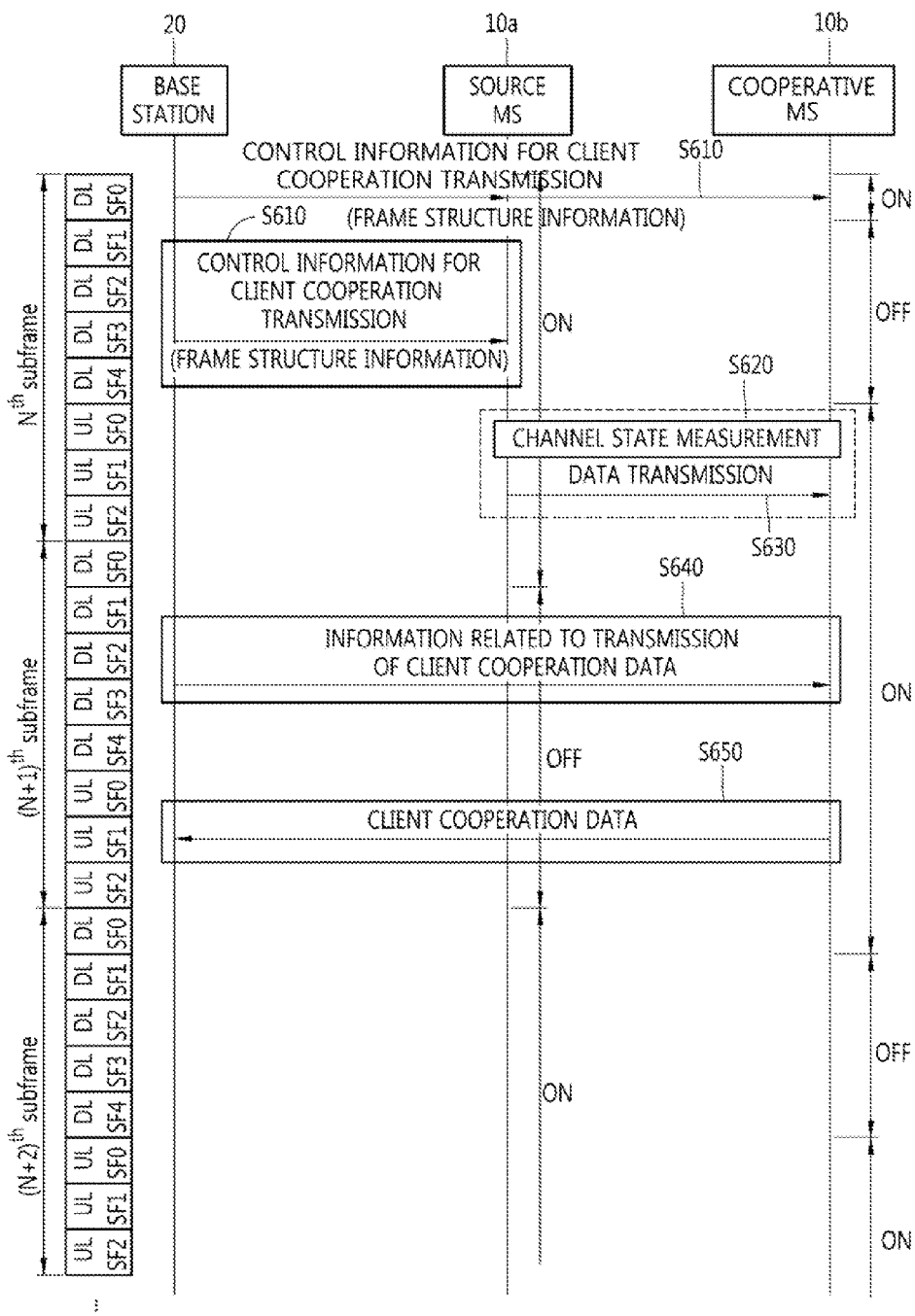
FIG. 6 is a frame structure for client cooperation and a flowchart showing a method for client cooperation using the frame structure according to another embodiment of the present invention.

FIG. 6 is a frame structure for client cooperation and a flowchart showing a method for client cooperation using the frame structure according to another embodiment of the present invention.

That is, unlike in FIG. 5, in FIG. 6, a base station transmits control information for the client cooperation to MSs performing the client cooperation (an S-MS and a C-MS) through the frame of each MS in a unicast way (S610).

Here, the control information may include information related to channel state measurement between MSs and frame structure information for client cooperation.

Here, the frame structure information is information on which the C-MS performs the client cooperation with an operation being off in the downlink subframe of an Nth frame (with an operation being on in the first subframe of the $N^{th}$ frame) and an operation being on in the uplink subframe of the $N^{th}$ frame and the S-MS performs the client cooperation with an operation being on in the $N^{th}$ frame and an operation being off in the remaining subframes of the $(N+1)^{th}$ frame other than the first subframe. Here, the $N^{th}$ and the $(N+1)^{th}$ frames correspond to frames for client cooperation, and N is 0, 1, 2, 3, . . . .

As shown in FIG. 6, the C-MS performs the client cooperation operation only in the first DL subframe and the UL subframes 0, 1, and 2 of the $N^{th}$ frame (ON).

Furthermore, the S-MS performs the client cooperation operation using all the subframes of the $N^{th}$ frame (ON).

Here, the C-MS may maintain synchronization with the base station and the S-MS and obtain information about a frame for client cooperation by receiving broadcast information, such as a preamble or an SFH, from the base station through the DL first subframe.

Furthermore, the S-MS may receive control information for client cooperation through a preamble, an SFH, and an A-MAP from the base station using each DL subframe of the $N^{th}$ frame (S610).

Furthermore, the S-MS may receive information about the above-described control signal, that is, the reference signal or the sounding signal, from the base station through each DL subframe in order to measure a channel state with the C-MS (S610).

Here, the information about the control signal may be transmitted through UL-A-MAP or unicast control signaling (e.g., D2D_CC_inform).

Furthermore, the S-MS performs a (client cooperation) operation only in the first subframe of the $(N+1)^{th}$ frame and receives the preamble and the SFH from the base station through the first subframe.

Here, in the same subframe (the first subframe within the $(N+1)^{th}$), the C-MS receives the preamble, the SFH, and the A-MAP from the base station using the DL subframe.

Next, the S-MS and the C-MS measure the channel state between MSs based on the control information for client cooperation that has been received from the base station at step S610 (S620). Here, the S-MS or the C-MS may transmit the measured channel state to the base station.

Next, the S-MS transmits client cooperation data to the C-MS (S630).

Furthermore, the C-MS receives control information necessary to transmit the client cooperation data, received from the S-MS, from the base station using the DL subframes of the $(N+1)^{th}$ frame in order to perform the client cooperation (S640). Here, the control information necessary to transmit the client cooperation data may include resource allocation, transmission power, MIMO, a reference signal, and a UL sounding signal, and the control information may be received through a unicast signal message from the base station.

Furthermore, the control information transmitted from the base station to the C-MS through the $(N+1)^{th}$ DL subframes may further include information necessary to receive a signal transmitted from the S-MS to the C-MS in an $(N+2)^{th}$ frame.

Next, the C-MS transmits the client cooperation data, received from the S-MS, to the base station based on the information related to the transmission of the client cooperation data received at step S640 (S650).

That is, as shown in FIG. 6, the S-MS and the C-MS receive a signal from the base station using the DL subframe at one frame interval.

As described above, since the C-MS uses a control signal using the relevance time of one frame, the C-MS receives information about the signal, transmitted from the S-MS to the C-MS in the $N^{th}$ frame (through the uplink region of the $N^{th}$ frame), from the base station in a previous frame. Accordingly, the information for the channel state measurement between MSs (the reference signal or the sounding signal) is also used to measure a channel between the MSs using information received from the base station prior to one frame before the frame for channel state measurement.

A user specific signal or unicast control signal transmitted from the base station to the S-MS and the C-MS in order to perform client cooperation may include a grouping ID, a pairing ID/virtual ID allocated to the C-MS and the S-MS by the base station, or the user specific signal or unicast control signal may be transmitted in the state in which it has been masked as identification information.

Figure 7:
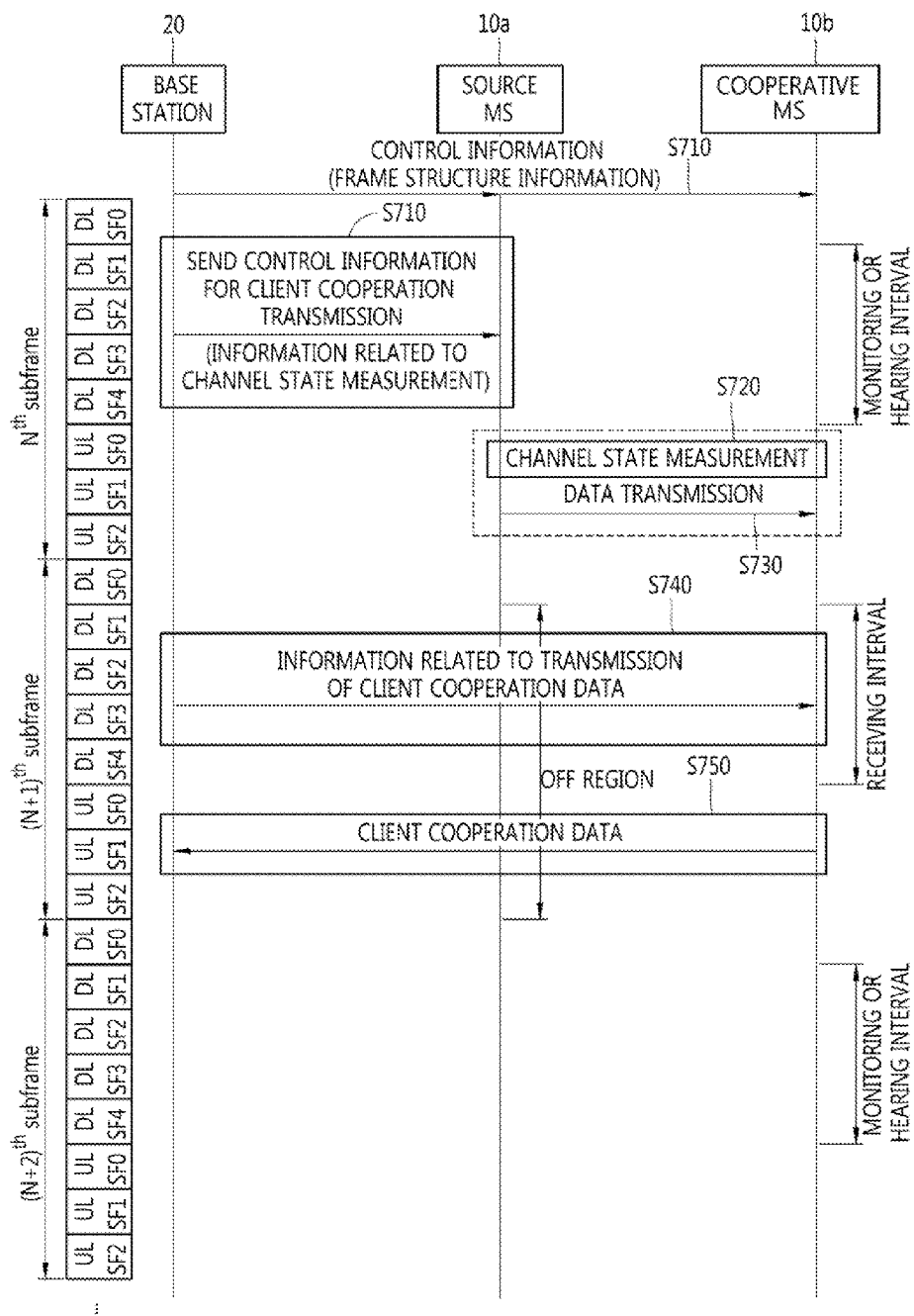
FIG. 7 is a frame structure for client cooperation and a flowchart showing a method for client cooperation using the frame structure according to another embodiment of the present invention.

FIG. 7 is a frame structure for client cooperation and a flowchart showing a method for client cooperation using the frame structure according to another embodiment of the present invention.

In the case of FIG. 6, the C-MS may turn on or off an operation in some subframes within a client cooperation frame and perform the client cooperation operation. In contrast, in the case of FIG. 7, the C-MS classifies the DL subframes of a client cooperation frame into two intervals and performs the client cooperation. That is, the two regions include the monitoring or hearing interval of an $N^{th}$ frame and the receiving interval of an $(N+1)^{th}$ frame.

The monitoring (or hearing) interval is an interval (or region) in which data and control information (including control information about a S-MS and control information for client cooperation) transmitted from a base station to the S-MS are monitored or heard in the $N^{th}$ frame, and the receiving interval is an interval in which the C-MS receives control information for transmitting data and a control signal, corresponding to the C-MS, and the client cooperation data of the S-MS to the base station, from the base station in the $(N+1)^{th}$ frame.

Referring to FIG. 7, the S-MS and the C-MS receive control information for client cooperation from the base station (S710). The control information includes information about a frame structure for client cooperation or control information for client cooperation.

Next, the C-MS monitors or hears a signal (S710), transmitted from the base station to the S-MS, in the DL subframes of the $N^{th}$ frame and receives data and a control signal, corresponding to the C-MS, or control information about the transmission of client cooperation data, received from the S-MS, from the base station in the DL subframes of the $(N+1)^{th}$ frame (S740).

As described above, in the DL subframes of the C-MS, the DL hearing/monitoring interval and the receiving interval are repeated per frame.

Furthermore, as shown in FIG. 7, the S-MS performs client cooperation using an off region that does not operate in a DL subframe in the $(N+1)^{th}$ frame, that is, every odd-numbered frame.

Information about the configuration of the DL subframe for the frame and information about the operation region are transmitted to the S-MS and the C-MS through a D2D collaboration transmission signal that is transmitted by the base station in the first subframe of a frame.

That is, the information about the frame structure is information on which the C-MS performs monitoring or hearing in a downlink subframe of the $N^{th}$ frame (except the first downlink subframe of the $N^{th}$ frame) and has a receiving interval in which a control signal and/or data are received in a downlink subframe of the $(N+1)^{th}$ frame and the S-MS turns off an operation in the remaining subframes of the $(N+1)^{th}$ frame other than the first subframe.

Here, the C-MS receives information on which the station identifier (STID) of the S-MS and control transmitted through a DL subframe can be received from the base station through D2D_CT (collaboration transmission signal) transmitted by the base station, that is, a user-specific message or a multicast signal transmitted to the two MSs performing or D2D (S710).

The C-MS which has monitored or heard the control signal (e.g., DL/UL A-MAP) transmitted by the base station through the DL subframe may check pieces of DL/UL transmission information (resource allocation, transmission power, MIMO, a pilot/sounding/pilot/reference signal, and HARQ) of the S-MS.

That is, as shown in FIG. 7, the C-MS may be aware of information, transmitted by the S-MS, by monitoring or hearing the control signal transmitted from the base station to the S-MS in the $N^{th}$ frame (the transmission of data from the S-MS or client cooperation).

That is, the C-MS may check data transmitted from the S-MS to the C-MS for client cooperation and information about the transmission through the monitoring or hearing interval of the $N^{th}$ frame. Furthermore, information about a sounding/pilot/reference signal for performing measurement on a transmission link between MSs may also be checked.

The C-MS may receive the sounding/pilot/reference signal, transmitted by the S-MS for channel state measurement between MSs, through the $N^{th}$ UL subframe and measure information about a transmission channel for client cooperation through the received signal (S720).

When the channel state measurement is terminated, the S-MS transmits client cooperation transmission data to the C-MS (S730).

Here, information about a client cooperation channel link that has been measured by the C-MS may be transmitted to the base station using a UL subframe of the $(N+1)^{th}$ frame.

Here, the C-MS receives a control signal for transmitting the data, information, and measured channel information, received from the S-MS through the $N^{th}$ UL subframes, to the base station from the base station through an $(N+1)^{th}$ DL subframe (S740).

Here, the information about client cooperation transmitted from the base station to the C-MS through the $(N+1)^{th}$ DL subframes may be transmitted to the C-MS through unicast/multi-cast signaling or a user-specific message using a grouping ID, a paring ID, or a virtual ID allocated to the C-MS by the base station for client cooperation.

Next, the C-MS transmits the client cooperation data, received from the S-MS, to the base station based on the information received at step S740 (S750).

Here, while the C-MS performs the client cooperation operation in the $(N+1)^{th}$ frame, the S-MS operates as off-duration in the subframes of the $(N+1)^{th}$ frame and thus does not transmit and receive signals. Accordingly, power consumption can be reduced because the S-MS does not perform transmission in the $(N+1)^{th}$ frame.

Figure 8:
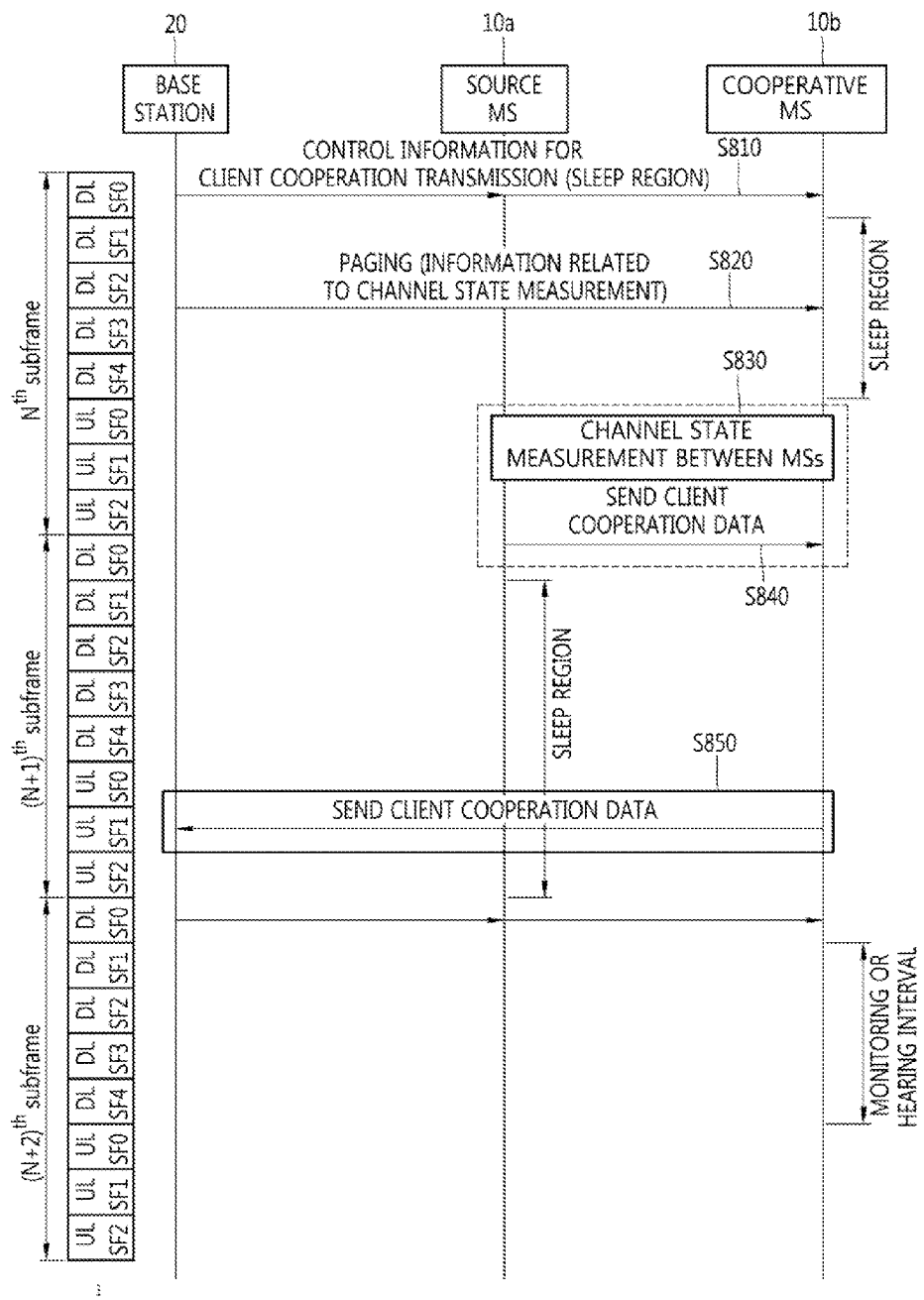
FIG. 8 is a frame structure for client cooperation and a flowchart showing a method for client cooperation using the frame structure according to another embodiment of the present invention.

FIG. 8 is a frame structure for client cooperation and a flowchart showing a method for client cooperation using the frame structure according to another embodiment of the present invention.

That is, FIG. 8 shows a method in which subframes within a frame are classified into a sleep subframe and an active subframe and client cooperation is performed, unlike in FIGS. 6 and 7 (defining a subframe or region in which an MS does not operate in a new frame structure or frame for client cooperation).

Referring to FIG. 8, an S-MS and a C-MS receive information about a sleep region in which each MS operates asleep in each frame from a base station through unicast/multi-cast signaling in order to perform client cooperation (S810).

The information about the sleep region includes at least one of the number of subframes, the length of a region, a subframe index (start point), the offset of a subframe, a period, a frame index, and the cycle of sleep.

The information about the sleep region may be transmitted using identification (group, pairing, or virtual), allocated to the S-MS and the C-MS by the base station for client cooperation, or may be transmitted using a user-specific signal.

For example, in order to efficiently transmit and receive signals through client cooperation using the frame structure shown in FIG. 8, the base station may transmit a D2D sleep response (D2D_SLP_RSP) message to the S-MS and the C-MS or may transmit a D2D terminal collaboration message (D2D_CT_message) including the information about the sleep region.

If the sleep region is set and client cooperation is performed, the C-MS may receive information for channel state measurement between MSs using paging (or a paging message or a paging signal) transmitted by the base station (S820).

Here, in a wireless access system supporting the above-described client cooperation, (by the base station or a paging controller) information about channel state measurement may be transmitted according to a cycle in which the paging is transmitted, or D2D paging information may be set for client cooperation and paging information may be transmitted to the C-MS every frame or superframe.

Here, information on which the D2D paging information is transmitted may be transmitted through an SFH or an A-MAP transmitted through the first subframe of a frame. Here, information for channel state measurement on a transmission link between MSs that is transmitted to the C-MS through the paging may include the above-described pieces of measurement information.

Next, the C-MS which has received a control signal (e.g., a sounding signal or a reference signal) for channel state measurement that has been transmitted by the S-MS using the paging information measures a channel state using the received control signal (S830) and transmits information about the measured channel state (an SINR, a CQI, a PMI, an interference level, a CINR, and CSI) to the base station using resources allocated by the base station in a next frame. Furthermore, after the step S830, the S-MS transmits client cooperation data to the C-MS (S840).

Next, the base station which has received the information about the channel state from the C-MS transmits a control signal for the transmission of the signal of the S-MS in a next frame using information about the received channel state.

Next, the C-MS transmits the client cooperation data to the base station based on the control signal for the transmission of the signal of the S-MS received from the base station (S850).

Here, as described with reference to FIGS. 5 to 8, in order to perform the client cooperation, the UL subframe of the C-MS switches into Rx mode and Tx mode every frame and is used.

Accordingly, the base station can transmit information about Tx or Rx mode for a UL subframe to the C-MS using a unicast or user-specific signal or may transmit the information about Tx or Rx mode to an MS through broadcast signal using D2D_SCD.

Here, if the base station transmits information about Tx/Rx mode using a unicast/user-specific signal, the information may be transmitted every frame or superframe.

The embodiment of the present invention and their modifications can be combined. Therefore, each embodiment can be implemented in combination as well as in its own. These combinations may be obvious to those skilled in the art from the description of the specification, and so detailed description thereof is omitted. Although the description on the combination has not been included in the specification, those combinations of embodiments shall be interpreted to be within the scope of the present invention.

The above-described embodiments and modifications may be made by various means, for example, in hardware, firmware, software, or in a combination thereof When implemented in hardware, the methods according to the embodiments of the present invention may be embodied by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

When implemented in firmware or software, the methods according to the embodiments of the present invention may be embodied in modules, procedures or functions that perform the above-described functions or operations. The software codes may be stored in a memory unit and driven by a processor. The memory unit may be positioned in or outside of the processor and may transmit or receive data to/from the processor by various known means.

For example, the methods according to the embodiments of the present invention may be stored in a storage medium (for example, an internal memory, a flash memory, a hard disk, etc.) and may be implemented as codes or commands in a software program that may be executed by a processor (for example, a microprocessor). This will be described with reference to FIG. 9.

Figure 9:
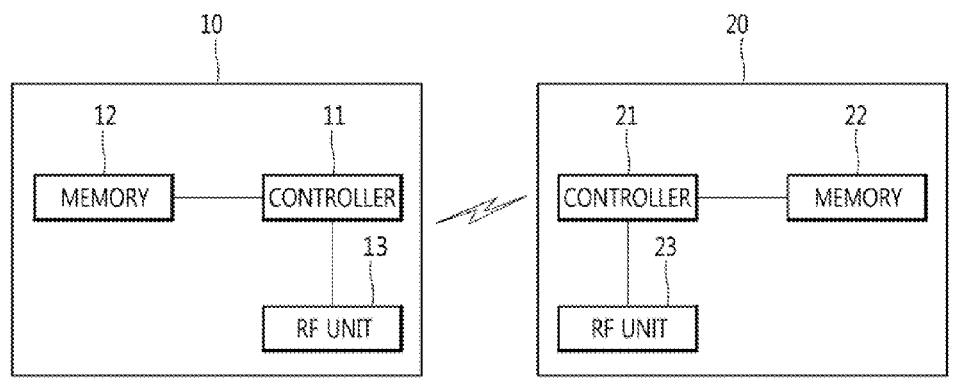
FIG. 9 is a block diagram showing internal structures of an MS and a BS in a wireless access system according to an embodiment of the present invention.

FIG. 9 is a block diagram showing internal structures of an MS and a BS in a wireless access system according to an embodiment of the present invention.

An MS 10 includes a controller 11, a memory 12, and a radio frequency (RF) unit 13.

Further, the MS also includes a display unit, a user interface unit, etc.

The controller 11 implements the proposed functions, procedures, and/or methods. Layers of a wireless interface protocol may be implemented by the controller 11.

The memory 12 is coupled to the controller 11, and stores a protocol or parameter for performing wireless communication. That is, the memory 12 stores an operating system of the MS, an application, and a general file.

The RF unit 13 is coupled to the controller 11, and transmits and/or receives an RF signal.

In addition, the display unit displays a variety of information of the MS, and may be a well-known element such as liquid crystal display (LCD), organic light emitting diodes (OLED), etc. The user interface unit may be constructed by combining well-known user interfaces such as a keypad, a touch screen, etc.

ABS 20 includes a controller 21, a memory 22, and an RF unit 23.

The controller 21 implements the proposed functions, procedures, and/or methods. Layers of a wireless interface protocol may be implemented by the controller 21.

The memory 22 is coupled to the controller 21, and stores a protocol or parameter for performing wireless communication.

The RF unit 23 is coupled to the controller 21, and transmits and/or receives an RF signal.

The controllers 11 and 21 may include an application-specific integrated circuit (ASIC), a separate chipset, a logic circuit, and/or a data processing unit. The memories 12 and 22 may include a read-only memory (ROM), a random access memory (RAM), a flash memory, a memory card, a storage medium, and/or other equivalent storage devices. The RF units 13 and 23 may include a baseband circuit for processing an RF signal. When the embodiment of the present invention is implemented in software, the aforementioned methods can be implemented with a module (i.e., process, function, etc.) for performing the aforementioned functions. The module may be stored in the memories 12 and 22 and may be performed by the controllers 11 and 21.

The memories 12 and 22 may be located inside or outside the controllers 11 and 21, and may be coupled to the controllers 11 and 21 by using various well-known means.

In addition, the terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms are intended to include the plural forms as well, unless the context clearly indicates otherwise. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

It will be understood that although the terms "first" and "second" are used herein to describe various elements, these elements should not be limited by these terms. These terms are only used to distinguish one element from another element. For example, a first component may be termed a second component, and similarly, a second component may be termed a first component without departing from the scope of the present invention.

When a component is mentioned as being "connected" to or "accessing" another component, this may mean that it is directly connected to or accessing the other component, but it is to be understood that there are no intervening components present. On the other hand, when a component is mentioned as being "directly connected" to or "directly accessing" another component, it is to be understood that there are no intervening components present.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparently understandable that claims failing to be explicitly cited in the appended claims are combined to construct new embodiments or can be included as new claims by amendment after filing the application.

What is claimed is:

1. A method of performing cooperation communication between mobile stations in a wireless access system, the method performed by a source mobile station (MS) and comprising:
receiving first control information for the cooperation communication from a base station (BS), the first control information including resource region information allocated for a channel state measurement between the source MS and a cooperative MS and information related to a control signal for the channel state measurement;
measuring a channel state with the cooperative MS based on the resource region information and the control signal;
transmitting data to the cooperative MS, the data for transmission by the cooperative MS to the BS based on the cooperative communication;
receiving second control information from the BS for the cooperation communication with the cooperative MS, the second control information including resource allocation information for data transmission based on the cooperative communication; and
performing the cooperation communication based on the second control information,
wherein the resource region information includes information related to at least one uplink subframe transmitted by each of the source MS and cooperative MS for a sounding signal for the channel state measurement,
wherein the first control information further includes frame structure information defining an on/off operation for each of the source MS and cooperative MS during the cooperation communication,
wherein the frame structure information includes first information and second information,
wherein the first information is related to a first on/off operation of the source MS on a time resource corresponding to each subframe included in at least one frame for the cooperation communication,
wherein the second information is related to a second on/off operation of the cooperative MS on the time resource,
wherein the source MS and the cooperative MS do not have a same on/off operation pattern.

2. The method of claim 1, wherein measuring the channel state comprises:
transmitting the control signal to the cooperative MS via a resource region indicated by the resource region information;
synchronizing with the cooperative MS; and
measuring the channel state based on the control signal.

3. The method of claim 1, wherein the resource region information further includes:
a number of the at least one uplink subframe in which the control signal is transmitted; and
indication information indicating the at least one uplink subframe in which the control signal is transmitted.

4. The method of claim 1, wherein the control signal is a ranging sequence, a reference signal, or a sounding signal.

5. The method of claim 1, wherein:
the frame structure information further includes information based upon which the source MS performs the cooperation communication with an operation being on in an $N^{th}$ frame and off in remaining subframes of an $(N+1)^{th}$ frame other than a first subframe; and
the cooperative MS performs the cooperation communication with an operation being off in downlink subframes of the $N^{th}$ frame other than a first subframe and on in uplink subframes of the $N^{th}$ frame and the $(N+1)^{th}$ frame.

6. The method of claim 1, wherein:
the frame structure information further includes information based upon which the source MS performs the cooperation communication with an operation being on in an $N^{th}$ frame and off in remaining subframes of an $(N+1)^{th}$ frame other than a first subframe; and
the cooperative MS performs a monitoring operation of a signal in remaining downlink subframes of the $N^{th}$ frame other than a first downlink subframe and performs a reception operation in downlink subframes of the $(N+1)^{th}$ frame.

7. The method of claim 1, wherein:
the frame structure information further includes information based upon which the cooperative MS performs a sleep operation in at least one downlink subframe of an $N^{th}$ frame; and
the source MS performs a sleep operation in remaining subframes of an $(N+1)^{th}$ frame other than a first subframe.

8. The method of claim 1, wherein the first control information further includes at least a station identifier (STID), a pilot pattern, reference sequence information, a time offset or an indication of transmit power.

9. The method of claim 1, wherein the second control information further includes at least a start time, duration or transmit parameter of the cooperation communication.

10. A method of performing cooperation communication between mobile stations in a wireless access system, the method performed by a cooperative mobile station (MS) and comprising:
receiving first control information for the cooperation communication from a base station (BS), the first control information including resource region information allocated for a channel state measurement between a source MS and the cooperative MS and information related to a control signal for the channel state measurement;
measuring a channel state with the source MS based on the resource region information and the control signal;
receiving data from the source MS, the data for transmission to the BS based on the cooperative communication;
receiving second control information from the BS for the cooperation communication with the source MS, the second information including resource allocation information for transmission of the data based on the cooperative communication; and
performing the cooperation communication based on second control information,
wherein the resource region information includes information related to at least one uplink subframe transmitted by each of the source MS and cooperative MS for a sounding signal for the channel state measurement,
wherein the first control information further includes frame structure information defining an on/off operation for each of the source MS and cooperative mobile station during the cooperation communication,
wherein the frame structure information includes first information and second information,
wherein the first information is related to a first on/off operation of the cooperative MS on a time resource corresponding to each subframe included in at least one frame for the cooperation communication,
wherein the second information is related to a second on/off operation of the source MS on the time resource, wherein the source MS and the cooperative MS do not have a same on/off operation pattern.

11. The method of claim 10, further comprising transmitting a result of the channel state measurement to the BS.

12. The method of claim 10, wherein:
the frame structure information further includes information based upon which the source MS performs the cooperation communication with an operation being on in an $N^{th}$ frame and off in remaining subframes of an $(N+1)^{th}$ frame other than a first subframe; and
the cooperative MS performs the cooperation communication with an operation being off in downlink subframes of the $N^{th}$ frame other than a first subframe and on in uplink subframes of the $N^{th}$ frame and the $(N+1)^{th}$ frame.

13. The method of claim 10, wherein:
the frame structure information further includes information based upon which the source MS performs the cooperation communication with an operation being on in an $N^{th}$ frame and off in remaining subframes of an $(N+1)^{th}$ frame other than a first subframe; and
the cooperative MS performs a monitoring operation of a signal in remaining downlink subframes of the $N^{th}$ frame other than a first downlink subframe and performs a reception operation in downlink subframes of the $(N+1)^{th}$ frame.

14. The method of claim 10, wherein:
the frame structure information further includes information based which the cooperative MS performs a sleep operation in at least one downlink subframe of an $N^{th}$ frame; and
the source MS performs a sleep operation in remaining subframes of an $(N+1)^{th}$ frame other than a first subframe.

15. A mobile station for performing cooperation communication in a wireless access system, the mobile station (MS) comprising:
a radio frequency (RF) unit configured to transmit and receive radio signals externally; and
a controller operatively connected to the RF unit, and configured to:
receive first control information from a base station (BS) for the cooperation communication with another mobile station, the first control information including resource region information allocated for a channel state measurement between the MS and the another MS for the cooperation communication and information related to a control signal for the channel state measurement;
measure a channel state between the MS and the another MS based on the resource region information and the control signal;
receive data from the another MS, the data for transmission to the BS based on the cooperative communication;
receive second control information from the BS for the cooperation communication with the another MS, the second control information including resource allocation information for transmission of the data based on the cooperative communication; and
perform the cooperation communication based on the second control information,
wherein the resource region information includes information related to at least one uplink subframe transmitted by each of the source MS and the another MS for a sounding signal for the channel state measurement,
wherein the first control information further includes frame structure information defining an on/off operation for each of the MS and the another MS
wherein the frame structure information includes first information and second information,
wherein the first information is related to a first on/off operation of the another MS on a time resource corresponding to each subframe included in at least one frame for the cooperation communication,
wherein the second information is related to a second on/off operation of the MS on the time resource,
wherein the MS and the another MS do not have a same on/off operation pattern.

* * * * *